US008618203B2

(12) United States Patent
Lee et al.

(10) Patent No.: US 8,618,203 B2
(45) Date of Patent: Dec. 31, 2013

(54) FLUOROPOLYMER COMPOSITE COMPOSITION

(75) Inventors: Jeong Chang Lee, Shizuoka (JP);
Noriyuki Suzuki, Shizuoka (JP);
Shousaku Kondo, Shizuoka (JP);
Hajime Sato, Shizuoka (JP)

(73) Assignees: Dupont-Mitsui Fluorochemicals Co., Ltd., Chiyoda-Ku, Tokyo (JP); E.I. Dupont de Nemours & Company, Wilmington, DE (US)

( * ) Notice: Subject to any disclaimer, the term of this patent is extended or adjusted under 35 U.S.C. 154(b) by 1017 days.

(21) Appl. No.: 12/580,823

(22) Filed: Oct. 16, 2009

(65) Prior Publication Data
US 2010/0036021 A1 Feb. 11, 2010

Related U.S. Application Data

(62) Division of application No. 10/546,006, filed as application No. PCT/JP2004/001868 on Feb. 19, 2004, now abandoned.

(30) Foreign Application Priority Data

Feb. 19, 2003 (JP) .................................. 2003-040853

(51) Int. Cl.
*C08K 9/04* (2006.01)
(52) U.S. Cl.
USPC ........... 524/445; 523/216; 524/121; 524/449; 524/544
(58) Field of Classification Search
USPC .................... 523/216; 524/445, 449, 544, 121
See application file for complete search history.

(56) References Cited

U.S. PATENT DOCUMENTS

| 5,320,789 A | 6/1994 | Nishii et al. |
| 5,552,199 A | 9/1996 | Blong et al. |

(Continued)

FOREIGN PATENT DOCUMENTS

| EP | 0 074 281 A1 | 3/1983 |
| EP | 1213321 A2 | 6/2002 |

(Continued)

OTHER PUBLICATIONS

Xie et al., "Thermal Stability of Quaternary Phosphonium Modified Montmorillonites", Chemistry of Materials, 2002, pp. 4837-4845, vol. 14 (11), American Chemical Society.

(Continued)

*Primary Examiner* — Peter D. Mulcahy
*Assistant Examiner* — Henry Hu
(74) *Attorney, Agent, or Firm* — Buchanan Ingersoll & Rooney, PC

(57) ABSTRACT

The present invention relates to a heat-meltable fluoropolymer composite composition having excellent thermal conductivity, gas and chemical liquid barrier properties and dynamic properties such as storage modulus which comprises a heat-meltable fluoropolymer fine powder and a layered-compound organized by treatment with tetraphenyl phosphonium ions. The present invention also relates to a heat-meltable fluoropolymer composite composition having similar properties to those mentioned above which is obtained by a process (I) in which a heat-meltable fluoropolymer composite composition is obtained by grinding and mixing a heat-meltable fluoropolymer fine powder and a layered-compound and a process (II) in which such heat-meltable fluoropolymer composite composition thus obtained is melted and mixed under shear stress by means of a melt-mixing extruder.

8 Claims, 1 Drawing Sheet

(56) References Cited

U.S. PATENT DOCUMENTS

| | | | |
|---|---|---|---|
| 5,804,116 | A | 9/1998 | Schmid et al. |
| 5,962,553 | A * | 10/1999 | Ellsworth .................... 523/216 |
| 6,057,035 | A | 5/2000 | Singh et al. |
| 6,169,276 | B1 | 1/2001 | Meyer |
| 6,841,211 | B1 * | 1/2005 | Knoll et al. .................. 428/34.5 |
| 2001/0021744 | A1 | 9/2001 | Araki et al. |
| 2002/0107320 | A1 | 8/2002 | Kuroki et al. |
| 2002/0132906 | A1 | 9/2002 | Kondo et al. |
| 2002/0136941 | A1 | 9/2002 | Bonnet et al. |
| 2002/0168569 | A1 | 11/2002 | Barriere et al. |
| 2002/0183438 | A1 | 12/2002 | Amarasekera et al. |
| 2003/0228463 | A1 * | 12/2003 | Abusleme et al. ............ 428/402 |

FOREIGN PATENT DOCUMENTS

| | | | |
|---|---|---|---|
| EP | 1384750 | A1 | 1/2004 |
| JP | 58-91772 | A | 5/1983 |
| JP | 61-69853 | A | 4/1986 |
| JP | 07-047644 | A | 2/1995 |
| JP | 07-070357 | A | 3/1995 |
| JP | 7-252365 | A | 10/1995 |
| JP | 2000-190431 | A | 7/2000 |
| JP | 2000-204214 | A | 7/2000 |
| JP | 2001-512768 | A | 8/2001 |
| JP | 2001-523278 | A | 11/2001 |
| JP | 2002-334721 | A | 11/2002 |
| JP | 2003-238819 | A | 8/2003 |
| JP | 2003-277610 | A | 10/2003 |
| JP | 2004-010891 | A | 1/2004 |
| WO | WO-98/10012 | * | 3/1998 |
| WO | WO 98/10012 | | 3/1998 |

OTHER PUBLICATIONS

Kirk-Othmer Encyclopedia of Chemical Technology, Third Edition, vol. 4, pp. 631-638, published by Willey-Interscience Publication, 1978.

Warren, "X-Ray study of the graphitization of carbon black," Proc. Conf. Carbon, $1^{st}$ and $2^{nd}$, 1956, pp. 49-58.

Alexander et al., "Systemic Analysis of Carbon Black Structures," Journal of Physical Chemistry, 1957, vol. 60 (12), pp. 1646-1649.

Chin et al., "On exfoliation of montmorillonite in epoxy," Polymer, 2000, n. 42, pp. 5947-5952.

Ullmann's Encyclopedia of Industrial Chemistry, Fifth ed., 1986, vol. A5, "Cancer Chemotherapy to Ceramic Colorants," pp. 140-142.

Tevoort et al., "Melt-processable poly(tetrafluoroethylene)-compounding, fillers and dyes," Journal of Fluorine Chemistry, 114, (2002), pp. 133-137.

* cited by examiner

FLUOROPOLYMER COMPOSITE COMPOSITION

CROSS REFERENCE TO RELATED APPLICATIONS

This application is a divisional of application Ser. No. 10/546,006, filed Aug. 18, 2005, which is a §371 of PCT/JP2004/001868, filed Feb. 19, 2004, which in turn claims priority to Japanese Patent Publication No. 2003-040853, filed Feb. 19, 2003, the disclosures of all of which are incorporated herein by reference in their entirety.

TECHNICAL FIELD

The present invention relates to a heat-meltable fluoropolymer composite composition having excellent thermal conductivity, gas and chemical liquid barrier properties, and dynamic properties such as storage modulus. More specifically, the present invention relates to a heat-meltable fluoropolymer composite composition having excellent thermal conductivity, gas and chemical liquid barrier properties, and dynamic properties such as storage modulus which comprises a heat-meltable fluoropolymer fine powder and a particular organically-modified layered-compound. The present invention further relates to a heat-meltable fluoropolymer composite composition having excellent thermal conductivity, gas and chemical liquid barrier properties, and dynamic properties such as storage modulus which is obtained by mixing a heat-meltable fluoropolymer fine powder and a layered-compound in advance so that the layered-compound is dispersed uniformly in the fine heat-meltable fluoropolymer powder, and then melt-mixing the mixture by use of a melt mixing extruder so that the layered-compound is further dispersed, cleaved or intercalated by shear stress in the heat-meltable fluoropolymer.

BACKGROUND ART

Heat-meltable fluoropolymers, such as tetrafluoroethylene-perfluoro(alkylvinylether) copolymer (PFA), tetrafluoroethylene-hexafluoropropylene copolymer (FEP) and tetrafluoroethylene-ethylene copolymer (ETFE) are used for the holding jigs and tube materials for the chemical liquid supply line in semiconductor manufacturing equipment because of their excellent heat resistance, chemical resistance, non-stickiness and other properties. However, the tubes made of these resins have to be replaced periodically owing to such problems as the contamination of the peripheral devices and environmental pollution due to the permeation of the chemical liquid. For this reason, there is a demand for materials showing lower chemical liquid permeability. Furthermore, when these resins are used for the heat exchanger tubes in an alkali tank, the tubes show low thermal conductivity, and therefore there is also a demand for materials exhibiting higher thermal conductivity.

For the purpose of solving these problems, there is a demand for a resin composition showing higher performance in various fields. For this purpose, improvements of the mechanical strength, chemical or gas permeability, thermal conductivity, etc., for example, by dispersing a filler in the resin are proposed. Especially, many attempts are made to use the technique of dispersing or cleaving a layered-compound in a polymer material or intercalating a polymer compound between the laminas of a layered-compound to improve the mechanical properties and chemical liquid or gas permeability of such resin, or the technique of dispersing a carbon compound in a polymer material to improve thermal conductivity.

For example, Japanese Patent Publication 2000-190431 describes a multi-layer laminate whose gas or chemical liquid permeability is lowered by melt-mixing a scale-like filler and a fluoropolymer and by laminating. Furthermore, Japanese Patent Publication HEI 2-10226 describes a method in which a layered clay mineral used for a filler is organically-modified, a monomer is inserted into the space between the laminas of this layered-compound where interlaminar distance is increased by organic-modification, and then the layered-compound is dispersed on nano scale by utilizing polymerization energy released during the polymerization of the aforesaid monomer. However, the aforesaid polymerization method cannot be said to be economical because although the polymerization method allows the filler to be dispersed efficiently, it requires polymerization equipment, entailing high cost. Besides, since the monomer that is inserted between the laminas of the aforesaid layered clay mineral will not stay stably between the laminas, a gas monomer is not preferable, and the choice of the monomer is limited to a liquid monomer.

As a method for improving these problems with the polymerization method, each of Japanese Patent Publication HEI 7-47644 and Japanese Patent Publication HEI 7-70357 describes a method in which a layered clay mineral is organized with organic cations in advance, the layered clay mineral is caused to be infinite-swolled by use of an organic solvent, and then the clay mineral is caused to come into contact with a melted resin liquid so that it is dispersed in the resin on nano scale. However, such method essentially requires the use of a large amount of an organic solvent in causing a layered clay mineral to be swelled, but a fluoropolymer has the problem of extremely low compatibility with an organic solvent. On top of that, the infinite-swollen layered-compound by use of the aforesaid organic solvent also has the problem of returning to a swollen state from such infinite-swollen state as part of the organic solvent will evaporate at the temperature of extrusion of the fluoropolymer in such process of coming into contact with the melted resin.

Furthermore, as a means for improving the problems with the layered-compound using such organic solvent, there is a method, for example, in which an organically modified layered clay mineral and resin pellets are melt-mixed by shear stress directly in an extruder so that such organically modified layered clay mineral is dispersed in the resin matrix. In connection with this, there is a report on the physical properties of a composite mixture in which such layered-compound is dispersed by changing the types (single-screw and twin-screw) of the extruder and the mixing method (co-rotating, counter-rotating, intermeshing and non-intermeshing) of a twin-screw extruder, among other conditions. However, there was no significant improvement reported in the mechanical properties of a composite mixture in which the layered clay mineral was dispersed which had been organized to some extent by melting and mixing the layered clay mineral by means of a twin-screw extruder of the non-intermeshing type with the result that the inter-layer distance was increased (Plastic Engineering, P56, 2001).

DISCLOSURE OF THE INVENTION

The inventors of the present invention have paid notice that the thermal conductivity, gas and chemical liquid barrier properties and dynamic properties such as storage modulus of a heat-meltable fluoropolymer composite can be improved by dispersing a layered-compound in which normally the unit crystal laminas constituting the layered-compound are present in such form that they are piled, further exfoliating (hereinafter referred to as "cleavage" in some cases) part of the layered-compound thus dispersed or exfoliating heat-meltable fluoropolymer between the laminas of the layered-compound so that the number of the laminas of the layered-compound is increased even if the weight percent of the layered-compound laminas that are present in the heat-meltable fluoropolymer is same. As a result, the inventors have found that a heat-meltable fluoropolymer composite composition having excellent thermal conductivity, gas and chemical liquid barrier properties and dynamic properties such as storage modulus can be provided.

The present invention provides a heat-meltable fluoropolymer composite composition having excellent thermal conductivity, gas and chemical liquid barrier properties and dynamic properties such as storage modulus. Specifically, the present invention provides a heat-meltable fluoropolymer composite composition comprising a heat-meltable fluoropolymer fine powder and a layered-compound organically modified by treatment with tetraphenyl phosphonium ions. Use of such particular layered-compound makes it possible to obtain a heat-meltable fluoropolymer composite composition having excellent thermal conductivity, gas and chemical liquid barrier properties and dynamic properties such as storage modulus only by melt-mixing such layered-compound by exerting shear stress by use of a melt-mixing extruder.

The present invention also provides a heat-meltable fluoropolymer composite composition which is obtained by a process (I) in which a heat-meltable fluoropolymer powdery composition is obtained by mixing a heat-meltable fluoropolymer fine powder and a layered-compound and a process (II) in which such heat-meltable fluoropolymer powdery composition thus obtained is melt-mixed by exerting shear stress by means of a melt-mixing extruder. Combination of these processes (I) and (II) makes it possible to obtain a heat-meltable fluoropolymer composite composition with satisfactory physical properties even by using any layered-compound other than the aforesaid particular layered-compound. It is thought that a heat-meltable fluoropolymer composite composition having excellent thermal conductivity, gas and chemical liquid barrier properties and dynamic properties such as storage modulus is obtained as a result of the layered-compound is dispersed, exfoliated or exfoliated more uniformly in the heat-meltable fluoropolymer under process (II) in which the materials are melt-mixed under shear stress, in addition to the mixing under process (I). Especially, an excellent effect in improving the physical properties can be produced by using a layered-compound organically modified by treatment with organic phosphonium ions, preferably tetraarylphosphonium ions, more preferably tetraphenylphosphonium ions.

Furthermore, the present invention provides a process for manufacturing a heat-meltable fluoropolymer composite composition which comprises a process (I) in which a heat-meltable fluoropolymer powdery composition is obtained by mixing a heat-meltable fluoropolymer fine powder and a layered-compound and a process (II) in which such heat-meltable fluoropolymer powdery composition thus obtained is melted and mixed by exerting shear stress by means of a melt mixing extruder.

In any of the above inventions, preferred embodiment is that an agglomerate powder having not more than 10 μm in average particle size which comprises agglomerated colloidal fine particles of heat-meltable fluoropolymer is used as the heat-meltable fluoropolymer fine powder. Furthermore, according to preferable embodiments of the mixing of a fine heat-meltable fluoropolymer powder and a layered-compound, a high-speed rotary mixer is used.

MOST PREFERRED EMBODIMENTS OF THE INVENTION

Figure 1:
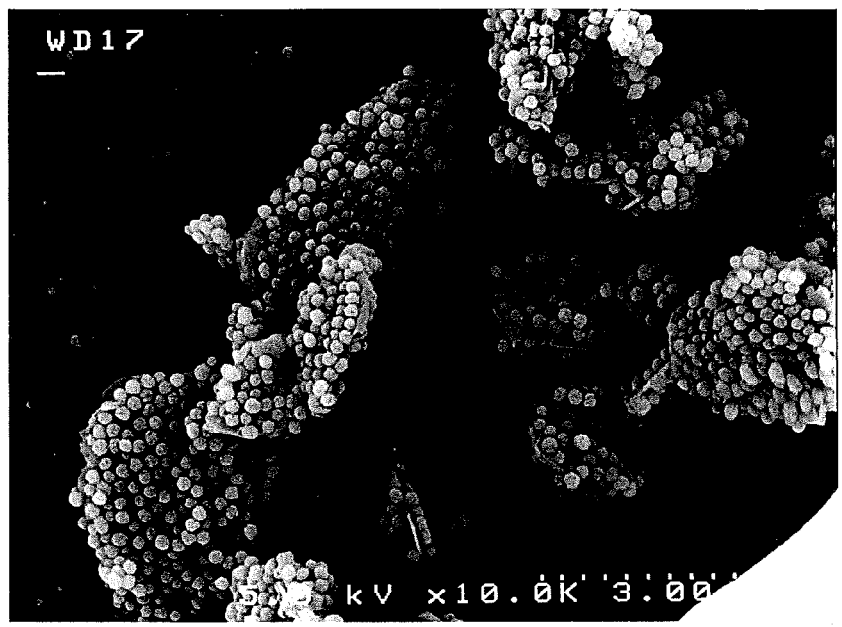
FIG. 1 is an electron microscopic picture of the powdery composition obtained in Example 1 described below.

For the heat-meltable fluoropolymer of the present invention, tetrafluoroethylene-perfluoro(alkylvinylether) copolymer (hereinafter referred to as"PFA"), tetrafluoroethylene-hexafluoropropylene copolymer (hereinafter referred to as "FEP"), tetrafluoroethylene-hexafluoropropylene-perfluoro(alkylvinylether) (alkylvinylether) copolymer (hereinafter referred to as "EPE"), tetrafluoroethylene-ethylene copolymer (hereinafter referred to as "ETFE"), polyvinylidenefluoride (hereinafter referred to as "PCTFE") and chlorotrifluoroethylene-ethylene copolymer (hereinafter referred to as "ECTFE") can be cited. Preferable examples of the heat-meltable fluoropolymer include tetrafluoroethylene-perfluoro(alkylvinylether) copolymer wherein alkyl group of perfluoro(alkylvinylether) is the one having 1 to 5 carbon atoms, more preferably 1 to 3 carbon atoms.

There is no particular restriction on the melt viscosity or molecular weight of any of these heat-meltable fluoropolymers. However, for the purpose of injection molding, the melt viscosity of the heat-meltable fluoropolymer is preferably 10 g/10 min to 40 g/10 min in terms of the melt index (ASTM D1238: 372° C., 5-kg load).

For the heat-meltable fluoropolymer fine powder used in the present invention, an agglomerated powder having average particle size of not more than 10 μm, preferably not more than 7 μm, more preferably not more than 5 μm, which comprises by agglomerating colloidal fine particles of heat-meltable fluoropolymer having average particle size of approximately 0.2 μm is used suitably. Such agglomerated powder can be obtained, for example, by adding an electrolytic substance to a heat-meltable fluoropolymer aqueous dispersion obtained by emulsion polymerization which contains in water approximately 1 to 75% by weight of colloidal fine particles of a heat-meltable fluoropolymer whose average particle size is approximately 0.1 to 0.3 μm, causing the colloidal fine particles of the heat-meltable fluoropolymer to be agglomerated with mechanical agitation, and then separating the agglomerated colloidal fine particles from the aqueous medium, and drying and washing them as required.

For the electrolytic substance used for the purpose of agglomerating the colloidal fine particles of the heat-meltable fluoropolymer in the heat-meltable fluoropolymer aqueous dispersion, water-soluble inorganic or organic compounds such as HCl, $H_2SO_4$, $HNO_3$, $H_3PO_4$, $Na_2SO_4$, $MgCl_2$, $CaCl_2$, sodium formate, potassium acetate and ammonium carbonate can be cited. Preferable examples of the electrolytic substance include the compounds that can be evaporated under the drying process in which the heat-meltable fluoropolymer fine particles after agglomeration are separated and dried, such as HCl and $HNO_3$, for example.

These electrolytic substances is preferably 1 to 15% by weight, especially 1.5 to 10% by weight against the weight of the heat-meltable fluoropolymer and is preferably added in the form of an aqueous solution to a heat-meltable fluoropolymer aqueous dispersion. If the weight of the electrolytic substance is less than 1% by weight, it will take a long time to agglomerate the colloidal fine particles of the heat-meltable fluoropolymer, and consequently productivity will be decline. Even if the electrolyte substance weight is more than 15% by weight, there would be no effect on the agglomeration of the colloidal fine particles of the heat-meltable fluoropolymer, but that would not be economical because a longer time will be required in the washing process.

There is no particular restriction on the equipment for causing the colloidal fine particles of the heat-meltable fluoropolymer to be agglomerated. However, the equipment preferably has a means for agitation that is capable of keeping circumferential velocity of not lower than approximately 4 m/sec, such as a propeller vane, turbine vane, paddle vane, paddle-shaped vane, horseshoe-shaped vane and helical vane, and a means for water discharge.

When the heat-meltable fluoropolymer aqueous dispersion is agitated in such equipment with a specified amount of an electrolytic substance added, the colloidal fine particles of the heat-meltable fluoropolymer are agglomerated to become agglomerated particles and are separated from the aqueous medium so that they will come up and float. At this time, agitation speed is preferably kept at not lower than approximately 4 m/sec. If agitation speed is lower than 4 m/sec, it will take a long time to cause the colloidal fine particles of the heat-meltable fluoropolymer to be agglomerated, and in addition, the aqueous medium will tend not to be readily discharged from the agglomerated particles of the heat-meltable fluoropolymer. Agitation is carried out until the agglomerated particles are separated from the aqueous medium.

The agglomerated heat-meltable fluoropolymer particles thus obtained are washed with water as required and then dried at a temperature not higher than the melting point of the heat-meltable fluoropolymer. Since such fluoropolymer fine powder has weak cohesion force between its inner particles, it is suitable to be ground down to primary particles by means of a high-speed rotating blade of a rotary mixer.

The layered-compound used in the present invention is preferably a layered-compound not more than 10 μm in particle size which has such structure that its unit crystal laminas are present in such form that they are piled. For example, it is one kind of layered-compound selected from among smectite-type clay minerals such as montmorillonite, hectoliter and vermiculite, various clay minerals such as zirconium phosphate and titanium phosphate, micas such as Na-type tetrasiliconfluorine mica and Li-type tetrasiliconfluorine mica, and graphite. Such mica and graphite may be either natural or synthetic materials. Such graphite is preferably scale-like graphite.

Furthermore, for these layered-compounds, it is preferably to increase the interlaminar distance by exchanging inorganic ions between laminas with other ions or inserting organic matter (hereinafter referred to as "organic modification") because it becomes easy to cleave these layered-compounds or intercalate heat-meltable fluoropolymer into them by shear stress in the mixing process in a high-speed rotary mixer or in the melt-mixing process in a melt-mixing extruder.

The organic matter used in such organizing treatment is preferably organic onium ions. There is no particular restriction on such organic onium ions, and organic onium ions that are not thermally decomposed at a temperature higher by at least 10° C. than the melting point of the heat-meltable fluoropolymer are preferable. Especially, from the perspective of thermal stability at the melt molding temperature of the heat-meltable fluoropolymer, phosphonium ions are preferable which show a higher thermal decomposition temperature than ammonium ions, which are generally used as common organic onium ions. Examples of such phosphonium ions include tetraethylphosphonium ions, tetrabutylphosphonium ions, tetrahexylphosphonium ions, dihexadecyldimethylphosphonium ions, dioctyldimethylphosphonium ions, cetyltrimethylphosphonium ions, cetyltriethylphosphonium ions, cetyldimethylethylphosphonium ions, tributylphosphonium ions, trihexylphosphonium ions, dioctylphosphonium ions, hexadecylphosphonium ions, tetraphenylphosphonium ions, n-butyltriphenylphosphonium ions, and benzyltriphenylphosphonium ions. Especially, as organic onium ions thermally stable even at the heat-meltable fluoropolymer melt molding temperature of at least not lower than 300° C., tetraphenylphosphonium ions, n-butyltriphenylphosphonium ions, and benzyltriphenylphosphonium ions are preferable, and particularly tetraphenylphosphonium ions are preferable. As stated above, when a layered-compound organized by treatment with tetraphenylphosphonium ions is used, it is possible to take much time for melt-mixing and obtain a heat-meltable fluoropolymer composite composition having satisfactory physical properties by melt-mixing alone because such layered-compound shows a high thermal decomposition initiation temperature and high heat resistance. Needless to say, in this case, combination of the aforesaid mixing process (I) and melt-mixing process (II) will make it possible to obtain a heat-meltable fluoropolymer composite composition having better physical properties.

The mixing ratio of the aforesaid layered-compound is preferably 1 to 40% by weight, more preferably 2 to 30% by weight, and much more preferably 3 to 20% by weight based on the weight of the heat-meltable fluoropolymer composite composition. A layered-compound mixing ratio of less than 1% by weight will produce only a little effect in improving the thermal conductivity or gas and chemical liquid barrier properties. Further, a layered-compound mixing ratio of over 40% by weight will cause a problem in processibility and flexibility. The mixing ratio of the heat-meltable fluoropolymer fine powder is preferably 60 to 99% by weight, more preferably 70 to 98% by weight, much more preferably 80 to 97% by weight based on the weight of the heat-meltable fluoropolymer composite composition.

Furthermore, for the purpose of improving compatibility between the aforesaid layered-compound subjected to organic-modification and the heat-meltable fluoropolymer fine powder and facilitating the insertion of the heat-meltable fluoropolymer between the laminas of the organically modified layered-compound in the mixing process in a melt-mixing extruder to increase the distance between the laminas and accelerate cleavage, thereby causing the heat-meltable fluoropolymer and the layered-compound to be dispersed more uniformly, it is preferable that the heat-meltable fluoropolymer fine powder should contain a heat-meltable fluoropolymer containing a functional group, that is, a heat-meltable fluoropolymer containing a functional group should be used as part of the heat-meltable fluoropolymer fine powder.

For such heat-meltable fluoropolymer containing a functional group, preferred are heat-meltable fluoropolymers containing a functional group selected from the group of the carboxylic acid group or its derivatives, hydroxyl group, nitrile group, cyanato group, carbamoyloxy group, phosphonooxy group, sulphonic acid group or its derivative group, and sulphohalide group, such as $-COOH$, $-CH_2COOH$, $-COOCH_3$, $-CONH_2$, $-OH$, $-CH_2OH$, $-CN$, $-CH_2O(CO)NH_2$, $-CH_2OCN$, $-CH_2OP(O)(OH)_2$, $-CH_2OP(O)Cl_2$ and $-SO_2F$.

Such heat-meltable fluoropolymers can be obtained by obtaining heat-meltable fluoropolymer by emulsion polymerization and then adding or substituting these functional groups, or by copolymerizing a fluorine-containing monomer containing any of the aforesaid functional groups at the time of the polymerization of the heat-meltable fluoropolymer. However, in the present invention, the heat-meltable fluoropolymer obtained by copolymerizing a fluorine-containing monomer containing any of the aforesaid functional groups at the time of the polymerization of the heat-meltable fluoropolymer is preferably used.

Examples of the fluorine-containing monomer containing the aforesaidan functional group that is suitable for copolymerization include fluorinated vinyl ether compounds containing a functional group that is shown by the formula:

$$CF_2=CF[OCF_2CF(CF_3)]_m-O-(CF_2)_n-X$$

[where m is 0 to 3; n is 0 to 4; X represents —COOH, —CH$_2$COOH, —COOCH$_3$, —CONH$_2$, —OH, —CH$_2$OH, —CN, —CH$_2$O(CO)NH$_2$, —H$_2$OCN, —CH$_2$OP(O)(OH)$_2$, —CH$_2$OP(O)Cl$_2$ or SO$_2$F.]

Their specific examples include monomers represented by:

$$CF_2=C-O-CF_2CF_2-SO_2F, \text{ or} \quad \text{Formula}$$

$$CF[OCF_2CF(CF_3)]O(CF_2)_2-Y \quad \text{Formula}$$

(where, Y represents —SO$_2$F, —CN, —COOH or —COOCH$_3$), or $$CF_2=CF[OCF_2CF(CF_3)]O(CF_2)_2-CH_2-Z \quad \text{Formula}$$

(where, Z represents —COOH, —OH, OCN, —OP(O)(OH)$_2$, —OP(O)Cl$_2$ or —O(CO)NH$_2$.)

The fluorine-containing monomer containing such functional group is preferably copolymerized in the fluoropolymer containing a functional group in the amount of 0.5 to 10% by weight, preferably 1 to 5% by weight. If the content of the fluorine-containing monomer containing such functional group to be copolymerized is lower than 0.5% by weight, only a little effect will be produced in improving compatibility between the aforesaid layered-compound subjected to organizing treatment and the heat-meltable fluoropolymer and facilitating the insertion of the heat-meltable fluoropolymer between the laminas of the organized layered-compound in the melting and mixing process in a melting and mixing extruder to increase the inter-layer distance and accelerate cleavage, thereby causing the heat-meltable fluoropolymer and the layered-compound to be dispersed more uniformly. Furthermore, if the content of the fluorine-containing monomer containing such functional group to be copolymerized is higher than 10% by weight, a reaction similar to crosslinking reaction will occur due to the strong interaction between the fluoropolymers containing a functional group, with the result that the viscosity will increase sharply. This will make the insertion of the compound into the laminas or melt processing difficult and lead the heat resistance of the fluoropolymer containing a functional group to tend to decline.

There is no particular restriction on the viscosity or molecular weight of the heat-meltable fluoropolymer containing a functional group, but the viscosity or molecular weight of the fluoropolymer containing a functional group is preferably not higher than that of the heat-meltable fluoropolymer and is more preferably close to that of the heat-meltable fluoropolymer.

The relative use amount of the heat-meltable fluoropolymer containing a functional group based on the heat-meltable fluoropolymer fine powder differs with the type of the functional group and the content of the fluorine-containing monomer containing a functional group but is normally 0.1 to 50% by weight against 99.9 to 50% by weight of the heat-meltable fluoropolymer fine powder, preferably 1 to 45% by weight against 99 to 55% by weight of the heat-meltable fluoropolymer fine powder. The heat-meltable fluoropolymer containing a functional group is preferably mixed with the heat-meltable fluoropolymer fine powder by means of a high-speed rotary mixer.

In the present invention, it is preferable that the heat-meltable fluoropolymer fine powder not more than 10 μm in average particle size and the layered-compound not more than 10 μm in average particle size should be pulverized and mixed in advance so that a heat-meltable fluoropolymer fine powder mixed composition in which the layered-compound has been dispersed uniformly in the heat-meltable fluoropolymer fine powder in advance is obtained, and then the layered-compound is further dispersed, exfoliated or exfoliated more uniformly in the heat-meltable fluoropolymer.

Methods for pulverizing and mixing the heat-meltable fluoropolymer fine powder not more than 10 μm in average particle size and the layered-compound not more than 10 μm in average particle size in advance so that the layered-compound is dispersed uniformly in the heat-meltable fluoropolymer fine powder in advance have been proposed, for example, in Japanese Patent Publications 2002-284883 and 2003-82187 filed by the present applicant before. According to these methods, the layered-compound can be dispersed uniformly in the heat-meltable fluoropolymer fine powder in advance by pulverizing and mixing the heat-meltable fluoropolymer fine powder not more than 10 μm in average particle size and the layered-compound not more than 10 μm in average particle size by use of a high-speed rotary mixer having blades or cutter knives that rotate at the rotational speed of not lower than 1,500 rpm or the circumferential velocity of not lower than 35 m/sec, preferably at the rotational speed of 3,000 to 20,000 rpm or the circumferential velocity of 70 to 115 m/sec.

For such high-speed rotary mixer, a cutter mixer available from Aikosha Seisakusho Co., Ltd. and an Eirich Intensive Mixer available from EIRICH Japan can be cited for example. On the other hand, the dry blenders commonly used for mixing fluoropolymer pellets and fillers, etc. or the Henschel mixers commonly used for mixing powder are inferior in mixing capacity, and it is difficult to use such mixers to disperse the layered-compound uniformly. However, when any layered-compound that has been organized with tetraphenylphosphonium ions is used as the layered-compound, it is possible to use such mixers to mix such layered-compound and the heat-meltable fluoropolymer fine powder in advance to obtain the raw material for melt mixing under shear stress.

At the time of the mixing by use of a high-speed rotary mixer as mentioned above, antistatic agents such as carbon black may be added to prevent the heat-meltable fluoropolymer fine powder from being deposited on the inside walls of the high-speed rotary mixer due to static electricity. In addition, any other additives may be added to suit the purpose.

The heat-meltable fluoropolymer composite composition of the present invention which comprises a heat-meltable fluoropolymer fine powder and a layered-compound may be melt-mixed by a melt-mixing extruder after being compacted by use of a compactor so that they may be fed well to the hopper of the melt mixing extruder.

For the melt-mixing extruder used in the met-mixing process of the present invention, twin-screw extruders are preferably used from the perspective of shear stress for the sake of exfoliating the layered-compound more effectively so that it will be dispersed in the heat-meltable fluoropolymer, depending on the type and melt viscosity of the heat-meltable fluoropolymer used. Moreover, the melt-mixing temperature in such twin-screw extruder is preferably below 360° C. for the objective of avoiding the decomposition of the layered-compound subjected to organic modification.

The method for pulverizing and mixing the heat-meltable fluoropolymer fine powder not more than 10 μm in average particle size and the layered-compound not more than 10 μm in average particle size in advance by use of a high-speed rotary mixer and then melt-mixing the mixture by use of a melt-mixing mixer is different from the common mixing process for mixing a melt-pelletized heat-meltable fluoropolymer powder several hundred μm in average particle size or heat-meltable fluoropolymer pellets several thousand μm in average particle size and a filler. Besides, according to the conventional direct melt-mixing method, the cleavage or intercalation of an organically modified layered-compound and a heat-meltable resin has to be carried out simultaneously while the layered-compound is being dispersed in the heat-meltable resin in the melt-mixing mixer. However, according to the aforesaid method of the present invention, the heat-meltable fluoropolymer fine powder and the organically modified layered-compound are pulverized and mixed uniformly in advance by use of a high-speed rotary mixer, and consequently it is possible to shorten overall melt-mixing time in the melting and mixing mixer. In the melt-mixing mixer, cleavage or intercalation is carried out for the most part. Therefore, if a resin whose melt processing temperature is high such as the heat-meltable fluoropolymer is used, it is possible by shortening overall melt-mixing time to prevent the decomposition of the heat-meltable fluoropolymer containing a functional group which is lower in thermal stability than the organized layered-compound or the heat-meltable fluoropolymer. Especially if a layered-compound organically modified with tetraphenylphosphonium ions is used as the layered-compound, it is possible to take a longer melt-mixing time in a melt-mixing extruder because such layered-compound shows a high temperature at which thermal decomposition begins and high heat resistance, and it is also possible to carry out cleavage or intercalation easily by melt-mixing alone in a melt-mixing extruder even if the pulverizing and mixing process as mentioned above is omitted.

EXAMPLES

The present invention will be described below specifically by using Examples, Comparative Examples and Reference Examples. However, the present invention is not limited to these Examples in any way.

Further, tetrafluoroethylene perfluoropropylvinylether (PPVE) was used for tetrafluoroethylene perfluoro(alkylvinylether) copolymer (PFA) copolymer, and the nitrogen gas permeability and thermal conductivity of the heat-meltable fluoropolymer composite composition were measured by the following methods:

(a) Nitrogen Gas Permeability:

The nitrogen gas permeability of film approximately 0.3 mm in thickness and 130 mm in diameter which had been prepared by melt-compression-molding the heat-meltable fluoropolymer composite composition at 350° C. was measured at 23° C. by use of a gas permeability measuring device (Model S-69 160 ml) available from Shibata Kagaku Kogyou Co., Ltd. The measurement values were expressed in $10^{-11}$ $cm^3$ (STP) $cm/cm^2$.sec.cmHg.

(b) Thermal Conductivity:

The thermal conductivity of a specimen 30 mm in diameter and 7 mm in height cut from a billet (diameter: 35 mm; height: 40 mm) prepared by melt-compression-molding the heat-meltable fluoropolymer composite composition at 350° C. was measured at the specimen pressing torque of 70 cN.m and at 23° C. by use of a hot desk method thermal property determination device (Model TPA-501) available from Kyoto Denshi Kogyou Co., Ltd. It should be noted that the measurement of thermal conductivity was performed only for a heat-meltable fluoropolymer composite composition containing graphite.

(c) Storage Modulus:

A specimen 12 mm×45 mm×1.5 mm was prepared from a sample prepared by melt-compression-molding the heat-meltable fluoropolymer composite composition at 350° C. was measured by the torsion mode at 1 Hz and the temperature rise rate of 5° C./min by use of a ARES dynamic viscoelasticity measuring device available from Rheometric Scientific.

Example 1

60 kg of 30% by weight PFA aqueous dispersion (melting point: 307° C.; MFR: 1.9 g/10 min) obtained by emulsion polymerization were put in an agitation tank (100-liter) of the down flow type having an agitation shaft with 6 vanes of the propeller type, and 500 g of 60% nitric acid were added with agitation at 300 rpm. In addition, agitation was conducted at 300 rpm for 10 min. After the aqueous dispersion was agglomerated, the agglomerated PFA particles were caused to come up and float on the aqueous polymerization medium by agitating the dispersion at 450 rpm for 20 min so that the PFA particles were separated from the aqueous polymerization medium. After that, the aqueous polymerization medium was discharged from the agitation tank, and water was put in the agitation tank to wash the PFA particles. After that, the PFA particles were dried at 160° C. for 24 hours, and as a result, PFA fine powder. The average particle size of the PFA fine powder thus obtained was 3 μm.

85% by weight of this PFA fine powder and 15% by weight of synthetic graphite (available from TIMCAL; TIMREX KS4; average particle size: 2.4 μm) as the layered-compound were charged to a high-speed rotary mixer (a cutter mixer available form Kaikousha Seisakusho Co., Ltd.) and mixed at 3,600 rpm (circumferential velocity: 75.3 m/sec) for 20 min. As a result, a powder mixed composition was obtained. FIG. 1 shows an electron microscopic picture (magnifying power: 10,000 times) of the powder mixed composition thus obtained. Furthermore, the powder mixed composition was melted and mixed at 350° C. and 50 rpm in a melting and mixing twin-screw extruder (available from Toyo Seiki Seisakusho Co., Ltd.; Laboplastomill 30C150). As a result, a heat-meltable fluoropolymer composite composition was obtained.

The nitrogen gas permeability, storage modulus and thermal conductivity of the heat-meltable fluoropolymer composite composition thus obtained were measured. Measurement results are shown in Table 1.

Example 2

A heat-meltable fluoropolymer composite composition was obtained by the same method as described in Example 1 except that 80% by weight of PFA fine powder and 20% by weight of synthetic graphite were used. The nitrogen gas permeability and thermal conductivity of the heat-meltable fluoropolymer composite composition thus obtained were measured. Measurement results are shown in Table 1.

Examples 3 to 6

Heat-meltable fluoropolymer composite compositions were obtained by the same method as described in Example 1 except that 90, 85 or 80% by weight of PFA fine powder and 10, 15 or 20% by weight of pure natural graphite (available from SEC Co., Ltd.; SNO-3; average particle size: 3 μm) as the layered-compound in place of synthetic graphite were used. The nitrogen gas permeability and thermal conductivity of the heat-meltable fluoropolymer composite compositions thus obtained were measured. Measurement results are shown in Table 1.

Example 6

An organized synthetic fluorine mica in which the ion exchange amount of the synthetic fluorine mica was 80 meq per 100 g was obtained by using a synthetic fluorine mica (available from COOP Chemical; Somasif ME-100; average particle size: 4.6 μm) as the layered clay compound and using tetraphenylsulphonium ions on the basis of Japanese Patent Publication 2003-238819. The temperature of the synthetic fluorine mica using tetraphenylsulphonium ions at which it began to decompose thermally was approximately 450° C. (air: 90 cc/min; temperature rise rate: 10° C./min).

Figure 2:
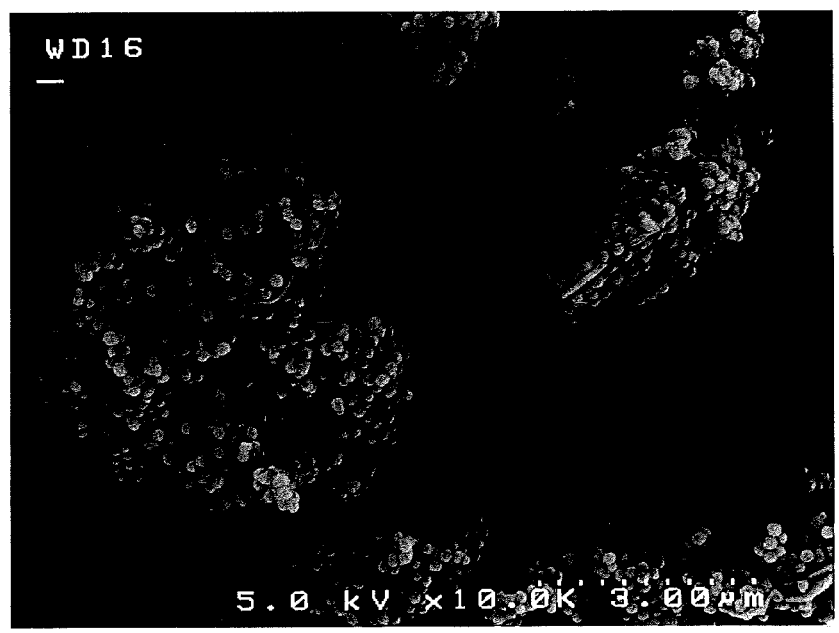
FIG. 2 is an electron microscopic picture of the powdery composition obtained in Example 6 described below.

3% by weight of the synthetic fluorine mica thus obtained and 97% by weight of the PFA fine powder obtained by the same method as described in Example 1 were charged to a high-speed rotary mixer (a cutter mixer available from Aikosha Seisakusho Co., Ltd.; AC-200S) and mixed at 3,600 rpm (circumferential velocity: 75.3 m/sec) for 20 min. As a result, a powder mixed composition was obtained. FIG. 2 shows an electron microscopic picture (magnifying power: 10,000 times) of the powder mixed composition thus obtained. Furthermore, the powder mixed composition was melted and mixed at 350° C. and 50 rpm in a melting and mixing twin-screw extruder (available from Toyo Seiki Seisakusho Co., Ltd.; Laboplastomill 30C150). As a result, a heat-meltable fluoropolymer composite composition was obtained.

The nitrogen gas permeability and storage modulus of the heat-meltable fluoropolymer composite composition thus obtained were measured. Measurement results are shown in Table 2.

Examples 7 and 8

Heat-meltable fluoropolymer composite compositions were obtained by the same method as described in Example 6 except that 5 or 10% by weight of the synthetic fluorine mica organized with phosphonium ions and 95 or 90% by weight of the PFA fine powder were used. The nitrogen gas permeability and storage modulus of the heat-meltable fluoropolymer composite composition thus obtained were measured. Measurement results are shown in Table 2.

Example 9

A heat-meltable fluoropolymer powder composition was obtained by charging 75% by weight of the PFA fine powder obtained by the same method as described in Example 1, 20% by weight of a functional group-containing PFA fine powder, which is a ternary copolymer of tetrafluoroethylene, perfluoro(propylvinylether) (PPVE) and $CF_2=CF[OCF_2CF(CF_3)]OCF_2CF_2CH_2OH$(PPVE content: 3.7% by weight; aforesaid hydroxyl-group-containing monomer content: 1.0% by weight; melt flow rate: 15 g/10 min), and 5% by weight of the synthetic fluorine mica organically modified with phosphonium ions which was obtained by the same method as described in Example 6 to a high-speed rotary mixer (a cutter mixer available from Aikosha Seisakusho Co., Ltd.; AC-200S) and melting and mixing them at 3,600 rpm (circumferential velocity: 75.3 m/sec) for 20 min in the mixer. Furthermore, the powder composition thus obtained was melted and mixed at 350° C. and 50 rpm in a melting and mixing twin-screw extruder (available from Toyo Seiki Seisakusho Co., Ltd.; Laboplastomill 30C150). As a result, a heat-meltable fluoropolymer composite composition was obtained. The nitrogen gas permeability and storage modulus of the heat-meltable fluoropolymer composite composition thus obtained were measured. Measurement results are shown in Table 2.

Example 10

95% by weight of the PFA fine powder obtained by the same method as described in Example 1 and 5% by weight of the synthetic fluorine mica organized with phosphonium ions which was obtained by the same method as described in Example 6 were melted and mixed at 350° C. and 50 rpm in a melting and mixing twin-screw extruder (available from Toyo Seiki Seisakusho Co., Ltd.; Laboplastomill 30C150). The nitrogen gas permeability and storage modulus of the mixture thus obtained were measured. Measurement results are shown in Table 2.

Comparative Example 1

The nitrogen gas permeability, storage modulus and thermal conductivity of the heat-meltable fluoropolymer composite composition comprising only the PFA fine powder obtained by the same manner as in Example 1 were measured. Measurement results are shown in Tables 1 and 2.

Comparative Example 2

85% by weight of PFA pellets (Teflon PFA 350J pellets; available from Du Pont-Mitsui Fluorochemicals Co., Ltd.) and 15% by weight of synthetic graphite (available from TIMCAL; TIMREX KS4; average particle size: 2.4 μm) were melted and mixed at 350° C. and 50 rpm in a melting and mixing twin-screw extruder (available from Toyo Seiki Seisakusho Co., Ltd.; Laboplastomill 30C150). The nitrogen gas permeability, storage modulus and thermal conductivity of the mixture thus obtained were measured. Measurement results are shown in Table 1.

Comparative Example 3

A mixture was obtained by the same manner as in Comparative Example 2 except that the synthetic fluorine mica organized with phosphonium ions which was obtained by the same method as described in Example 6 was used in place of synthetic graphite. The nitrogen gas permeability and storage modulus of the mixture thus obtained were measured. Measurement results are shown in Table 2.

As is clear from FIG. 1, it can be seen that in the powder mixed composition mixed by a high-speed rotary mixer, the scale-like particles 2.4 μm in average particle size are completely covered with primary PFA particles 0.2 μm in average particle size. Consequently, with the present invention, it is possible to disperse the scale-like graphite uniformly in the PFA powder at the stage of the mixing of the powder in a high-speed rotary mixer prior to melting and mixing. Furthermore, from Table 1, it can be seen that the heat-meltable fluoropolymer composite composition of the present invention which was obtained by further melting and mixing the powder mixed composition exhibits higher thermal conductivity and storage modulus and lower nitrogen gas permeability than the case of 100% heat-meltable fluoropolymer fine powder (Comparative Example 1). Furthermore, the heat-meltable fluoropolymer composite composition of the present invention (Examples 1 and 4) shows higher thermal conductivity and storage modulus and lower nitrogen gas permeability than the mixture using PFA pellets of the same composition (Comparative Example 2).

fluoropolymer fine powder (Comparative Example 1). Furthermore, the heat-meltable fluoropolymer composite composition using the heat-meltable fluoropolymer containing a functional group in place of part of the heat-meltable fluoropolymer (Example 9) shows lower nitrogen gas permeability and higher storage modulus than the case of the heat-meltable fluoropolymer composite composition not

TABLE 1

|  | PFA (wt %) | | Layered compound (wt %) | | Nitrogen gas permeability | Storage modulus (Pa) at 25° C. | Thermal conductivity (W/m · K) |
| --- | --- | --- | --- | --- | --- | --- | --- |
|  | Fine powder | Pellet | Synthetic graphite | Natural graphite |  |  |  |
| Example 1 | 85 | — | 15 | — | 6.4 | 6.3E+08 | 0.65 |
| Example 2 | 80 | — | 20 | — | 5.8 | 9.1E+08 | 0.97 |
| Example 3 | 90 | — | — | 10 | 7.3 | 4.8E+08 | 0.56 |
| Example 4 | 85 | — | — | 15 | 6.2 | 6.5E+08 | 0.7 |
| Example 5 | 80 | — | — | 20 | 5.5 | 9.3E+08 | 1.1 |
| Comp. Ex. 1 | 100 | — | — | — | 12.1 | 2.4E+08 | 0.2 |
| Comp. Ex. 2 | — | 85 | 15 | — | 8.6 | 5.7E+08 | 0.47 |

TABLE 2

|  | PFA(wt %) | | | Layered compound (wt %) | | Nitrogen gas permeability | Storage modulus (Pa) at 25° C. |
| --- | --- | --- | --- | --- | --- | --- | --- |
|  | Fine powder | Pellet | Functional group-containing PFA fine powder | Synthetic fluorine mica | Organization agent |  |  |
| Example 6 | 97 | — | — | 3 | Phosphonium | 6.9 | 3.4E+08 |
| Example 7 | 95 | — | — | 5 | Phosphonium | 6.3 | 4.0E+08 |
| Example 8 | 90 | — | — | 10 | Phosphonium | 5.5 | 5.1E+08 |
| Example 9 | 75 | — | 20 | 5 | Phosphonium | 4.5 | 5.0E+08 |
| Comp. Ex. 1 | 100 | — | — | — | Phosphonium | 12.1 | 2.4E+08 |
| Comp. Ex. 3 | — | 95 | — | 5 | Phosphonium | 8.6 | 3.5E+08 |

As evidenced by FIG. 2, it can be seen that in the powder mixed composition mixed by a high-speed rotary mixer, the synthetic fluorine mica is completely covered with primary PFA particles 0.2 μm in average particle size. Consequently, with the present invention, it is possible to disperse a layered-compound such as mica uniformly in the PFA powder at the stage of the mixing of the powder in a high-speed rotary mixer prior to melting and mixing. Therefore, in the present invention, it is possible to shorten overall melting and mixing time in the melting and mixing mixer because cleavage or intercalation is carried out primarily in the melting and mixing mixer after the heat-meltable fluoropolymer fine powder and the organized layered-compound are ground and mixed uniformly in advance by use of a high-speed rotary mixer, with the result that the time for dispersing the layered-compound in the melted resin becomes shorter. Moreover, if a resin whose melt molding temperature is high such as the heat-meltable fluoropolymer is used, it is possible by shortening overall melting and mixing time to prevent the decomposition or deterioration of the heat-meltable fluoropolymer containing a functional group which is lower in thermal stability than the organically modified layered-compound or the heat-meltable fluoropolymer. In addition, from Table 2, it can be seen that the heat-meltable fluoropolymer composite composition of the present invention obtained by further melting and mixing the powder mixed composition exhibits lower nitrogen gas permeability and higher storage modulus and lower nitrogen gas permeability than the case of 100% heat-meltable containing the heat-meltable fluoropolymer containing a functional group (Example 7).

Further, if a layered-compound organically modified with tetraphenylphosphonium ions is used as the layered-compound, it is possible to obtain a composite composition showing low nitrogen gas permeability and high storage modulus without going through the grinding and mixing process (Example 10).

Therefore, the heat-meltable fluoropolymer composite composition of the present invention is useful for use as a molding material for heat-exchanger tubes in acid and alkali tanks requiring chemical resistance and high thermal conductivity and transfer facilities and storage containers used in the semiconductor manufacturing process and various chemical processes and as a lining material for piping and tanks. In addition, it is also useful for use in molded articles requiring high elastic modulus or mechanical strength because high load is applied to them.

Applicability to Industrial Use

In the present invention, when a layered-compound organically modified with tetraphenylphosphonium ions is used as the layered-compound, it is possible to obtain a heat-meltable fluoropolymer composite composition having excellent thermal conductivity or dynamic properties such as gas and chemical liquid barrier properties and storage modulus only by melting and mixing the heat-meltable fluoropolymer fine powder and the layered-compound.

According to the present invention, it is possible to obtain a heat-meltable fluoropolymer composite composition having excellent thermal conductivity or dynamic properties such as gas and chemical liquid barrier properties and storage modulus by grinding and mixing the heat-meltable fluoropolymer fine powder and the layered-compound in advance by use of a high-speed rotary mixer or the like to disperse the layered-compound in the heat-meltable fluoropolymer fine powder and then by melting and mixing such mixture by use of a melt compounding extruder so that the layered-compound is further dispersed, exfoliated and exfoliated in the heat-meltable fluoropolymer fine powder.

It is possible by selecting these raw materials, pulverizing and mixing conditions, melt compounding conditions, and other conditions properly to obtain easily a heat-meltable fluoropolymer composite composition which shows nitrogen gas permeability not more than 0.60 times, and/or thermal conductivity not less than 2 times, and/or storage modulus at 25° C. not less than 1.5 times as high as those of the heat-meltable fluoropolymer not containing the layered-compound.

Kinds of molded articles finally molded from the heat-meltable fluoropolymer composite composition of the present invention are not particularly limited but include those molded articles requiring higher thermal deformation temperature, high storage modulus or flexural modulus, such as tubes, sheets, rods, fibers, packings and linings, for example.

The invention claimed is:

1. A process for manufacturing a heat-meltable fluoropolymer composite composition which comprises a step (I) in which a heat-meltable fluoropolymer composite composition is obtained by mixing a heat-meltable fluoropolymer fine powder and a layered-compound by use of a high-speed rotary mixer whose blades or cutter knives have a circumferential velocity of not less than 35 m/sec and a step (II) in which such heat-meltable fluoropolymer composite composition thus obtained is melt-mixed by exerting shear stress within a melt-mixing extruder.

2. The process for manufacturing a heat-meltable fluoropolymer composite composition according to claim 1, wherein said heat-meltable fluoropolymer fine powder is an agglomerate powder having average particle size of not more than 10 μm which comprises agglomerated colloidal fine particles of heat-meltable fluoropolymer.

3. A heat-meltable fluoropolymer composite composition which is obtained by a step (I) in which a heat-meltable fluoropolymer composite composition is obtained by mixing a heat-meltable fluoropolymer fine powder and a layered-compound by use of a high-speed rotary mixer whose blades or cutter knives have a circumferential velocity of not less than 35 m/sec and a step (II) in which such heat-meltable fluoropolymer composite composition thus obtained is melt-mixed by exerting shear stress within a melt-mixing extruder.

4. The heat-meltable fluoropolymer composite composition according to claim 3, wherein said layered-compound is organically modified with onium ions.

5. The heat-meltable fluoropolymer composite composition according to claim 3, wherein said layered-compound is at least one selected from the group consisting of clay mineral, mica and graphite which is not more than 10 μm in average particle size.

6. The heat-meltable fluoropolymer composite composition according to claim 3, whose nitrogen gas transmission rate is not more than 0.60 times as high as that of heat-meltable fluoropolymer containing no layered-compound.

7. The heat-meltable fluoropolymer composite composition according to claim 3, whose storage modulus at 25° C. is not less than 1.5 times as high as that of heat-meltable fluoropolymer containing no layered-compound.

8. The heat-meltable fluoropolymer composite composition according to claim 3, whose specific thermal conductivity is not less than 2 times as high as that of heat-meltable fluoropolymer containing no layered-compound.

* * * * *